US006682593B2

(12) United States Patent
Burch

(10) Patent No.: US 6,682,593 B2
(45) Date of Patent: Jan. 27, 2004

(54) AGGREGATE STABILIZING EMULSION AND A MIXTURE OF THE EMULSION WITH AGGREGATE

(75) Inventor: Richard M. Burch, Knoxville, TN (US)

(73) Assignee: ARR-MAZ Products, L.P., Winter Haven, FL (US)

( * ) Notice: Subject to any disclaimer, the term of this patent is extended or adjusted under 35 U.S.C. 154(b) by 83 days.

(21) Appl. No.: 10/143,689
(22) Filed: May 10, 2002

(65) Prior Publication Data
US 2003/0209168 A1 Nov. 13, 2003

(51) Int. Cl.[7] .............................................. C08L 91/00
(52) U.S. Cl. ...................................... 106/222; 106/228
(58) Field of Search .................................. 106/222, 228

(56) References Cited
U.S. PATENT DOCUMENTS

| 4,437,896 A | * | 3/1984 | Partanen ..................... 106/223 |
| 4,822,425 A | | 4/1989 | Burch ....................... 106/273.1 |
| 4,859,245 A | * | 8/1989 | Schilling et al. ............. 106/277 |
| 5,021,476 A | * | 6/1991 | Pinomaa ....................... 524/77 |
| 6,065,903 A | | 5/2000 | Doyle ......................... 106/243 |
| 6,077,340 A | * | 6/2000 | Doyle ......................... 106/225 |

* cited by examiner

Primary Examiner—Helene Klemanski
(74) Attorney, Agent, or Firm—Dennis G. LaPointe; Mason Law, P.A.

(57) ABSTRACT

An emulsion for stabilizing aggregate utilizes an amount of soap solution comprising a mixture of water and a non-ionic surfactant and further utilizes a base mixture including a pine tar mixture and a drying oil, such as linseed oil. The composition of the base mixture comprises between about 1 percent and 70 percent, by weight, of the emulsion and the particle size of the emulsion is no greater than about 10 microns. When the emulsion is appropriately blended with an aggregate so that the base mixture comprises between about 5 to 7 percent of the emulsion/aggregate blend, the resulting product is suitable for applications, such as paving and roadway applications, or other applications in which the aggregate is desired to be stabilized.

21 Claims, 1 Drawing Sheet

AGGREGATE STABILIZING EMULSION AND A MIXTURE OF THE EMULSION WITH AGGREGATE

BACKGROUND OF THE INVENTION

This invention relates generally to means and methods for stabilizing aggregates and relates, more particularly, to means for stabilizing aggregates to produce a product which can be used, for example, for paving, patching or sealing roadways, driveways, parking lots, trails, sidewalks and pathways or for use in other applications in which stabilizing of aggregate is necessary, such as in building blocks or the like.

In my prior U.S. Pat. No. 4,822,425, I described a liquid emulsion which can be blended with aggregate and permitted to cure to a hardened condition to produce a product whose characteristics, such as durability, closely duplicate those of asphalt and, accordingly, can be substituted for asphalt as a roadway paving material. Briefly, the described emulsion includes a substantial amount of pitch and rosin which, when mixed and compacted with appropriate amounts of water and aggregate and permitted to cure to a hardened condition, provides a solid product in which the aggregate is tightly bonded together and which is weight-supporting, water-impermeable and freeze-resistant. Furthermore, since the components of the emulsion are found in nature, the emulsion presents a reduced risk to the environment and may be preferred over asphalt for this reason.

It is an object of the present invention to provide a new and improved emulsion for stabilizing aggregate which, like the emulsion described in my referenced patent, includes a substantial amount of pitch and rosin and possesses characteristics which increase the useful life of the product within which the emulsion is blended.

Another object of the present invention is to provide such an emulsion which, when mixed with aggregate in appropriate amounts and permitted to cure to a hardened condition, provides a product which is water-resistant, is flexible and retains its flexibility over time and through prolonged exposure to the elements (e.g. weather and ultraviolet rays) and therefore doesn't become brittle, and resists cracking.

Still another object of the present invention is to provide such an emulsion whose components comprise renewable resources and can therefore be harvested on a sustainable basis.

Yet another object of the present invention is to provide such an emulsion which is non-toxic, non-hazardous, non-corrosive and environmentally-appropriate.

A further another object of the present invention is to provide such an emulsion which does not alter or effect the color of the aggregate with which it is ultimately used so that the color of the emulsion/aggregate mixture corresponds to that of the aggregate.

A still further object of the present invention is to provide such an emulsion which, when mixed with aggregate and permitted to cure to a hardened condition, yields a resulting product which is more light-reflective than asphalt and consequently provides cooler surface temperatures than asphalt.

A yet further object of the present invention is to provide such an emulsion which is uncomplicated in composition yet effective in operation.

One more object of the present invention is to provide a product comprised of a mixture of the emulsion and an aggregate.

SUMMARY OF THE INVENTION

This invention resides in an emulsion for stabilizing aggregate and a product formed by the blending of the emulsion and an aggregate.

The emulsion of the invention includes an amount of soap solution comprising a mixture of water and a non-ionic surfactant, and further includes a base mixture including a pine tar mixture and drying oil. The composition of the base mixture in the emulsion is within the range of between about 1 and 70 percent, by weight, and the particle size of the emulsion is no greater than about 10 microns.

BRIEF DESCRIPTION OF AN ILLUSTRATIVE EMBODIMENT

Figure 1:
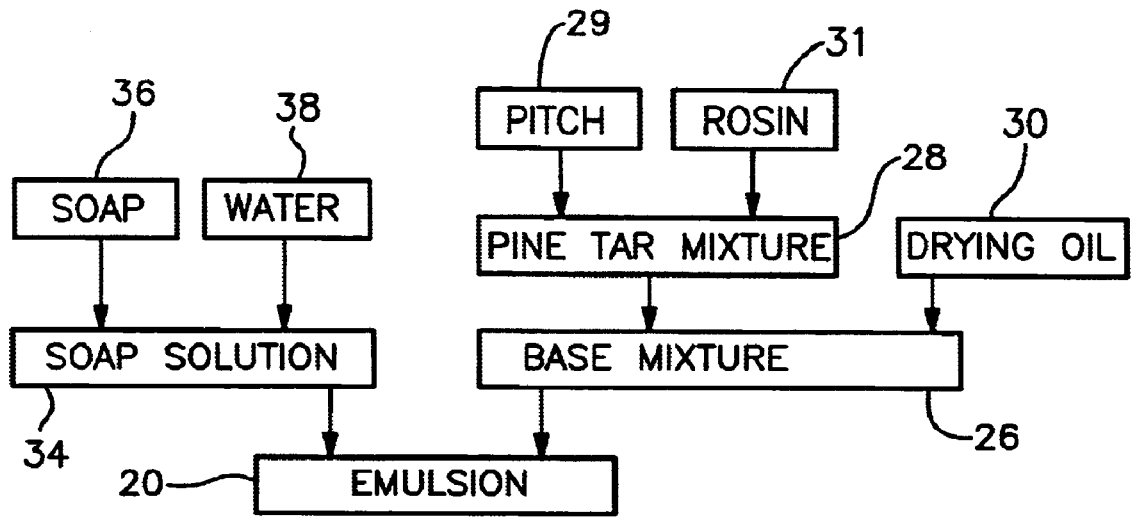
FIG. 1 is a schematic view illustrating in block diagram form the formulation of the emulsion of the present invention.

Turning now to the drawings in greater detail and considering first FIG. 1, there is schematically illustrated various components which are blended together in appropriate quantities to form an amount of emulsion 20 which can be blended with aggregate 22 (FIG. 2) for the purpose of stabilizing the aggregate 22 in a driveway or roadway surface 23. As will be apparent herein, the emulsion 20 is comprised of a quantity of a soap solution 24 (FIG. 1) and a quantity of a base mixture 26, described herein.

When the term "stabilizing" is used herein in context of stabilizing aggregate, it is meant that when aggregate is applied to roadways, trails, pathways and the like, the aggregate is held into place forming a solid paving surface which can be subjected to heavy traffic, such as automobiles and heavy trucks, and exposed to different weather conditions, such as freezing, thawing, wind and rain, without adversely altering the paving surface.

When the term "aggregate" is used herein, it is meant to refer to materials such as granular rock particles, shale or similar materials with comparable hardness and inertness, and which can be either natural or manufactured, and either in situ or imported. When aggregate is blended with the emulsion of the invention and the resulting mixture is thereafter permitted to harden, the resulting mixture provides a material suitable for use as a paving material having an enhanced strength and flexibility.

For the purpose of appropriately mixing, or blending, with the emulsion 20, the particles comprising the aggregate should preferably fall within a predetermined size distribution. Examples of a preferable size distribution for aggregates which can be suitably blended with the emulsion 20 to satisfactorily stabilize the aggregate are provided below as relating to a sieve analysis—that is to say, as corresponding to a percentage amount of the aggregate which will pass through sieves (i.e. screens) of predetermined sizes:

| Sieve Size | Percent (%) Passing |
| --- | --- |
| ⅜ inch | 100 |
| #4 | 92–100 |
| #8 | 56–75 |
| #16 | 31–52 |
| #30 | 20–35 |
| #50 | 13–19 |
| #100 | 12–14 |
| #200 | 7–11 |

Although the most preferred aggregate would pass 100 percent through the ⅜ inch sieve as above, this ⅜ inch aggregate top size is exemplary only. In other words, the emulsion 20 described herein can be used with any size dense graded aggregate of suitable size distribution.

With reference again to FIG. 1, the base mixture 26 is comprised of a quantity of pine tar mixture 28 and a quantity of a drying oil 30. The term "pine tar mixture" is intended to mean a homogenous blend of pine tar pitch 29 (i.e. tall oil pitch) and rosin 31 (i.e. tall oil rosin). Each of the components pitch and rosin can be categorized as a fatty acid (rather than an oil) and is a cross-linking compound.

A pine tar mixture which is suitable for use as the pine tar mixture 28 includes a composition of rosin which is in the range of between about 10 and 50 percent by weight of the mixture 28, and is preferably between about 25 and 35 percent, by weight (with a composition typically including about 30 percent rosin, by weight). Pine tar pitch naturally contains an amount of rosin but by first extracting a substantial amount of rosin out of the pine tar pitch and then controlling the amount of rosin put back into the pitch, the percentage amount of rosin in the mixture 28 can be controlled with some degree of accuracy. An example of pine tar pitch/rosin blend suitable for use in the mixture 28 is available from Arizona Chemical Co., of Jacksonville, Fla.

In the interests of the present invention, a "drying oil" suitable for use in the base mixture 26 of the present invention can be any oil of a group of drying oils consisting of linseed oil, soybean oil, sunflower oil, hemp oil, tung oil and oiticica oil. Each of such drying oils can also be categorized as an ester of glycol. For reasons relating to availability and cost effectiveness, linseed oil may be preferred over the other of the above-listed drying oils, but due to the similarity of characteristics between these oils, any of the aforelisted drying oils provides satisfactory results when used in the base mixture 26. When the base mixture 26 is subsequently employed within the emulsion 20, the drying oil 30 provides a strong cross linking between adjacent molecules which, upon mixing of the emulsion with aggregate and permitting the emulsion/aggregate to cure to a hardened condition, enhances the strength and flexibility of the aggregate-including product within which the emulsion 20 is ultimately used. It is believed that the capacity of the drying oil to cross link over a lengthy period of time (e.g. decades) helps to maintain the flexibility of an aggregate-including product within which the emulsion is used over the same (lengthy) period of time.

As far as the composition of drying oil 30 in the base mixture 26 is concerned, the drying oil 30 can comprise between about 1 and 50 percent, by weight, of the base mixture 26, with the composition of the drying oil 30 comprising preferably between about 10 and 30 percent, by weight, of the base mixture.

The pine tar mixture 28 is maintained in a heated, and thus flowable, condition when exposed to the drying oil 30 in a base tank. As will be apparent herein, the contents of the base tank are subsequently conducted through a colloid mill to reduce, and thereby limit, the particle size of the resulting emulsion 20 and for purposes of thoroughly mixing the base mixture 26 with the soap solution 24 within the emulsion 20.

The soap solution 24 used in the emulsion 20 is comprised of a mixture of a quantity of non-ionic surfactant 36 (i.e. a soap) and water 38. An example of a non-ionic surfactant suitable for use as the surfactant 36 in the emulsion 20 of the present invention is commercially available from Akzo Nobel Chemicals, Inc. of Chicago, Ill. under the trade designation Redicote I-48. Although the percentage (by weight) of surfactant 36 in the soap solution 24 could range anywhere from about 0.5 percent to about 5.0 percent, a soap solution comprising about 2.5 percent has been found to be particularly well-suited for use in this invention.

After preparation of the base mixture 26 and soap solution 24, the base mixture 26 and soap solution 24 are subsequently mixed together to form the desired emulsion 20. To this end and as mentioned earlier, the base mixture 26 and soap solution 24 are exposed to one another upon introduction of these components into a colloid mill which reduces the particle size of the resulting emulsion 20 and thoroughly blends the components of the emulsion 20 together. The colloid mill reduces the particle size of the emulsion 20 to no more than about 10 microns, with the average size of the particles normally being around 2.0 microns.

With its particle size limited to no more than about 10 microns, the emulsion assumes a stable condition in that it can be permitted to cool to room temperature (e.g. 75° F.) and still retain its flowable, or low viscosity, characteristics. Consequently, the emulsion 20 can be permitted to cool from its previously-heated condition to, for example, to ambient temperature for storage in a container for liquid. Along the same lines, a significant advantage provided by the emulsion 20 relates to its lengthy shelf life (i.e at least one year) and while still retaining its homogenous liquid state without loss of its ability to be easily mixed with aggregate for use. As will be apparent herein, the small particle size of the emulsion 20 is also advantageous in that promotes the coating of the surfaces of the aggregate when ultimately mixed therewith.

The proportion of base mixture 26, by weight, in the desired emulsion 20 can range anywhere from about 1 percent to about 70 percent. In practice, if the percentage of the base mixture 26 in the emulsion 20 is below about 1 percent, the capacity of the emulsion 20 to perform its intended function falls to an unacceptable level, and if the percentage of the base mixture 26 is greater than about 70 percent, the emulsion 20 will probably not be rendered satisfactorily stable. For preferred results, it is desirable that the percentage of base mixture 26 in the emulsion 20 be maintained within the range of between about 30 percent to about 55 percent, with a target percentage composition of the base mixture 26 being about 50 percent.

Figure 2:
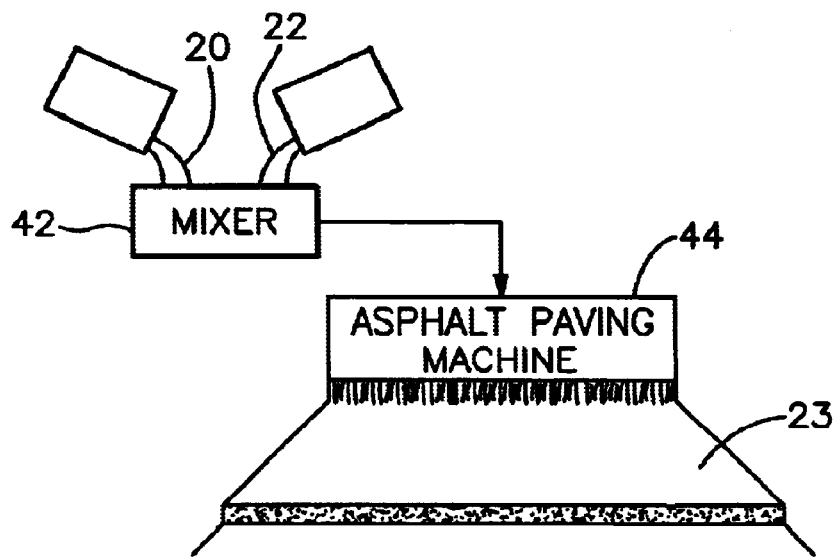
FIG. 2 is a schematic view depicting the blending of the FIG. 1 emulsion with aggregate during the formation of a driveway or similar roadway.

With reference to FIG. 2 and for purposes of mixing the emulsion 20 with aggregate to stabilize aggregate in, for example, a roadway or driveway 23, an amount of aggregate 22 and an amount of emulsion 20 are deposited within an appropriate mixing receptacle 42, such as a pug mill or a mobile concrete mixer. Preferably, the moisture content of the aggregate 20 placed within the mixing receptacle 42 is between about 2 and 4 percent, based upon the dry weight of the aggregate placed within the receptacle 42. Consequently, if the aggregate to be used is relatively dry, water can be added to and mixed within the aggregate, as necessary, to provide the desired aggregate moisture content.

Furthermore, the amount of emulsion 20 placed within the receptacle 42 is preferably between about 10 and 14 percent, based upon the dry weight of the aggregate placed within the receptacle 42, with about 12 percent emulsion being the most preferable.

Following the appropriate mixing of the emulsion 20 and aggregate 22 in the mixing receptacle 42, the resulting mixture is placed over the desired (e.g. driveway or roadway) area by way of, for example, an asphalt paving machine 44 depicted in FIG. 2 in much the same manner as asphalt is commonly spread into place, except that the emulsion/aggregate mixture is spread cold (i.e. at ambient conditions, rather than in heated condition). Following the spreading of the emulsion/aggregate mixture into place, the mixture is compacted with a roller (or rollers) and thereafter permitted to cure to a hardened condition.

The following test results (including a Marshall Stability Strength Test and an associated Flow [i.e. flexibility] Test) have been obtained on samples of various emulsion/aggregate mixtures wherein the aggregate of the various samples differs from one sample to the next. Typical specifications for hot mix asphalt for a heavy traffic application are 1800 lbs. minimum Marshall Stability and 8–15 Flow. In each emulsion/aggregate sample identified below, the composition of emulsion, comprised of about 50 percent base mixture, in the sample was between 10 and 12 percent, by weight, and the composition of linseed oil in the base mixture of the emulsion was between about 10 and 12 percent, by weight.

| Sample # | Aggregate Marshall | Stability (lbs) | Flow (1/100 inches) |
| --- | --- | --- | --- |
| I. | #4x Dust Crushed Gravel | 2080 | 15 |
| II. | GA Type 810 | 2438 | 14 |
| III. | New DG | 3870 | 14 |
| IV. | Vista Pink | 9282 | 15 |
| V. | ¼ Minus BSG | 3990 | 15 |
| VI. | ¼" Sedona Red | 7194 | 14 |
| VII. | ¼" Desert Mauve | 7085 | 14 |
| VIII. | Asphalt Type I Mix | 6962 | 9 |

It can be concluded from the test results provided above that good pavement results can be obtained with samples containing any of number of different aggregates. Furthermore and although the samples used to comprise the test results provided above utilize different aggregate materials, it will be understood that satisfactory (i.e. good paving) tests results can also be obtained by varying the composition of emulsion, comprised of about 50 percent base mixture, in the samples outside of the aforestated 10 to 12 percent range (to between, for example, a 10 to 14 percent range or an even broader range of between 1 and 18 percent) or by varying the amount of linseed oil in the base mixture of the emulsion outside of the aforestated 10 to 20 percent range (to between, for example, a range of between 10 to 30 percent). However, in any case and with a roadway or driveway application still in mind, it is preferable if the composition of the base mixture of the emulsion is such that when the emulsion is blended with the aggregate to form a product with the emulsion/aggregate blend, the composition of the base mixture in the product is between about 5 and 7 percent—which generally corresponds to the amount of bituminous material employed in common roadway asphalt mixes.

It follows that an emulsion 20 has been described which, when appropriately blended with aggregate 22 to form, for example, a roadway or driveway, provides a product which is an acceptable substitute for asphalt and, in many respects, is superior to asphalt. For example and unlike asphalt, the emulsion of this product does not alter the color of the aggregate with which the emulsion is ultimately blended. Therefore, the color of a roadway, pathway, etc. formed with the emulsion can be selected by chosing and utilizing an aggregate of the desired color. Therefore, the emulsion provides a significant advantage from an aesthetic standpoint over asphalt -which, when mixed with aggregate and permitted to cure, always renders a black-colored product. Along the same lines and because a product formed with the emulsion of the invention is not black in color, the product is more light-reflective than asphalt and consequently provides cooler surface temperatures. The lengthy shelf life of the emulsion and capacity to be stored and used at ambient (non-heated) conditions also renders the emulsion attractive for aggregate-stabilizing applications.

Further still, the components of the emulsion of the invention are non-toxic, non-hazardous, non-corrosive and environmentally-appropriate. Furthermore, the components of the base mixture are harvested from nature (i.e. are natural) on a renewable and sustainable basis. Accordingly and based upon environmental considerations, a product formed with the emulsion of the invention may be preferable than asphalt.

Further still, a product formed with the emulsion of this invention is flexible and consequently has a high resistance to the formation of cracks—even to the formation of spider cracks. Furthermore, the flexibility of the resulting product is retained over time and following prolonged exposure to the elements (e.g. weather and ultraviolet rays) and thus doesn't become brittle. Each of these characteristics enhances and lengthens the useful life of the product.

Yet still further, a product formed with the emulsion of this invention has been found to significantly improve upon the characteristics of a product formed with the emulsion described in my prior U.S. Pat. No. 4,822,425. More specifically, tests conducted on samples have substantiated that a product formed with the emulsion of the present invention is much more water-resistant (i.e. resistant to water penetration) and consequently is less susceptible to softening as a result of exposure to water. Further still, the product formed with the emulsion of this invention is much more "gummy" and consequently possesses better workability characteristics and holds together better than does the product formed with the emulsion of my referenced patent. These latter-listed characteristics help to render the product formed with the emulsion of this invention less likely to crumble (such as along the edges of the product), less likely to adhere to rollers used to compact the product, more resistant to damage from gouging activity (such as commonly accompanies the scraping action of a snowplow blade) when wet, more durable and lasts longer.

It will be understood that numerous modifications and substitutions can be had to the aforedescribed embodiment without departing from the spirit of the invention. For example, although much of the foregoing discussion has focused upon the utilization of the emulsion with aggregate for paving, patching or sealing in applications which can involve driveways, roadways, parking lots, trails, sidewalks and pathways, it will be understood that the emulsion 20 can be utilized with aggregate for use in other applications in which stabilizing of aggregate is necessary, such as in building blocks or the like. Accordingly, the aforedescribed embodiment is intended for the purpose of illustration and not as limitation.

What is claimed is:

1. An emulsion for stabilizing aggregate comprising:

a soap solution comprising a mixture of water and a non-ionic surfactant; and a base mixture including a pine tar mixture and a drying oil and wherein the composition of the base mixture in the emulsion is within the range of between about 1 and 70 percent, by weight, and wherein the particle size of the emulsion is no greater than about 10 microns.

2. The emulsion as defined in claim 1 wherein the drying oil of the base mixture is an oil of the group of oils consisting of linseed oil, soybean oil, sunflower oil, hemp oil, tung oil and oiticica oil.

3. The emulsion as defined in claim 2 wherein the drying oil is linseed oil.

4. The emulsion as defined in claim 1 wherein the composition of non-ionic surfactant in the soap solution is within the range of between about 0.5 and 5 percent, by weight.

5. The emulsion as defined in claim 1 wherein the composition of drying oil in the base mixture is within the range of between about 1 and 50 percent, by weight.

6. The emulsion as defined in claim 5 wherein the composition of drying oil in the base mixture is within the range of between about 10 to 30 percent, by weight.

7. The emulsion as defined in claim 1 wherein the pine tar mixture of the base mixture includes a blend of pitch and rosin, and the composition of the rosin in the pitch and rosin blend is between about 10 and 50 percent, by weight.

8. The emulsion as defined in claim 7 wherein the composition of the rosin in the pitch and rosin blend is between about 25 and 35 percent, by weight.

9. The emulsion as defined in claim 1 wherein the composition of base mixture in the emulsion is within the range of about 30 percent and 55 percent, by weight.

10. The emulsion as defined in claim 9 wherein the composition of base mixture in the emulsion is about 50 percent, by weight.

11. The emulsion as defined in claim 1 mixed with an aggregate to form a product.

12. An emulsion for blending with aggregate for the purpose of stabilizing the aggregate, the emulsion comprising:

a soap solution comprising a mixture of water and a non-ionic surfactant wherein the composition, by weight, of the non-ionic surfactant in the soap solution is within the range of between about 0.5 and 5 percent; and a base mixture including pine tar mixture and a drying oil wherein the composition of the base mixture in the emulsion is within the range of between about 30 and 55 percent, by weight, and wherein the particle size of the base mixture is no greater than about 10 microns.

13. A product formed by the blending of an aggregate and an emulsion for stabilizing the aggregate wherein the emulsion is comprised of:

a) a soap solution comprising a mixture of water and a non-ionic surfactant; and b) a base mixture including pine tar mixture and drying oil wherein the composition of the base mixture in the emulsion is between 1 and 70 percent, by weight, and wherein the particle size of the base mixture in the emulsion is no greater than about 10 microns.

14. The product as defined in claim 13 wherein the composition of emulsion in the product is between 1 and 18 percent, based upon the dry weight of aggregate in the blend.

15. The product as defined in claim 13 wherein the composition of emulsion in the product is between 10 and 14 percent, based upon the dry weight of aggregate in the blend of emulsion and aggregate.

16. The product as defined in claim 13 wherein the composition of base mixture in the product is between 5 and 7 percent, by weight.

17. The product as defined in claim 16 wherein the composition of the base mixture in the emulsion is about 50 percent, by weight, and the composition of emulsion in the blend of emulsion and aggregate is between about 10 and 14 percent, based upon the dry weight of the aggregate.

18. The product as defined in claim 13 wherein the moisture content of the aggregate when mixed with the emulsion is between about 2 and 4 percent, based upon the dry weight of the aggregate.

19. The product as defined in claim 13 wherein the drying oil of the base mixture of the emulsion is an oil of the group of oils consisting of linseed oil, soybean oil, sunflower oil, hemp oil, tung oil and oiticica oil.

20. The product as defined in claim 19 wherein the drying oil of the base mixture of the emulsion is linseed oil.

21. The product as defined in claim 13 wherein the composition, by weight, of the non-ionic surfactant in the soap solution of the emulsion is within the range of between about 0.5 and 5 percent, and wherein the composition of the base mixture in the emulsion is within the range of between about 30 and 55 percent, by weight.

* * * * *